(12) United States Patent
Xu et al.

(10) Patent No.: US 12,332,109 B2
(45) Date of Patent: Jun. 17, 2025

(54) METHOD FOR CONFIGURING A CALIBRATION MECHANISM AND FORCE SENSOR THEREOF

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Lei Xu, Changzhou (CN); Jean Christophe Emery, Shanghai (CN); Li Yang, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler Toledo International Trading (Shanghai) Co., Ltd, Shanghai (CN)

( * ) Notice: Subject to any disclaimer, the term of this patent is extended or adjusted under 35 U.S.C. 154(b) by 261 days.

(21) Appl. No.: 18/010,030

(22) PCT Filed: Jun. 23, 2021

(86) PCT No.: PCT/CN2021/101760
§ 371 (c)(1),
(2) Date: Dec. 13, 2022

(87) PCT Pub. No.: WO2022/001772
PCT Pub. Date: Jan. 6, 2022

(65) Prior Publication Data
US 2023/0228615 A1    Jul. 20, 2023

(30) Foreign Application Priority Data

Jun. 29, 2020 (CN) .......................... 202010608984.7

(51) Int. Cl.
*G01G 23/01* (2006.01)

(52) U.S. Cl.
CPC ................................. *G01G 23/012* (2013.01)

(58) Field of Classification Search
CPC ............................. G01G 23/012; G01L 25/00
See application file for complete search history.

(56) References Cited

U.S. PATENT DOCUMENTS 6,194,672 B1   2/2001   Burkhard et al.
6,414,252 B1   7/2002   Emery et al.
(Continued)

FOREIGN PATENT DOCUMENTS

CN   102879073 A   *   1/2013
DE     20022494 U1      10/2001
(Continued)

*Primary Examiner* — Octavia Hollington
(74) *Attorney, Agent, or Firm* — Standley Law Group LLP; Jeffrey S. Standley; Adam J. Smith (57) ABSTRACT

A method for configuring a calibration mechanism in a force sensor (100) has the steps of: coupling an end of the calibration lever (1071) to a loading end (102) of the force sensor; adjusting, in a no-load condition, the center of gravity ($G_0$) of the unloaded calibration lever (1071), so that the center of gravity ($G_0$) lies on a horizontal line (H) through the center of a calibration lever fulcrum (1031) at a fixed end (103) thereof; and adjusting, in a full-load condition, the center of gravity ($G_1$) of the calibration lever (1071) loaded with the calibration weight (106), so that the center of gravity ($G_1$) lies on the horizontal line (H) through the center of the calibration lever fulcrum. The calibration error caused by inclination in the force sensor is reduced by practice of this method.

12 Claims, 4 Drawing Sheets

(56) References Cited

U.S. PATENT DOCUMENTS

| | | | | |
|---|---|---|---|---|
| 6,861,593 | B2* | 3/2005 | Kuhlmann | G01G 21/244 |
| | | | | 73/1.13 |
| 7,478,551 | B2* | 1/2009 | Tellenbach | G01G 23/012 |
| | | | | 177/264 |
| 9,146,149 | B2* | 9/2015 | Burkhard | G01G 23/012 |
| 9,612,149 | B2* | 4/2017 | Burkhard | G01G 19/414 |
| 11,231,314 | B2 | 1/2022 | Burkhard et al. | |
| 2013/0233045 | A1* | 9/2013 | Burkhard | G01G 7/04 |
| | | | | 73/1.13 |

FOREIGN PATENT DOCUMENTS

| | | | | |
|---|---|---|---|---|
| GB | 2088061 | A * | 6/1982 | G01G 23/012 |
| GB | 2254431 | A * | 10/1992 | G01G 23/01 |
| KR | 20020082663 | A * | 10/2002 | |

\* cited by examiner

METHOD FOR CONFIGURING A CALIBRATION MECHANISM AND FORCE SENSOR THEREOF

BACKGROUND OF THE INVENTION

Technical Field

The present invention relates to a method for configuring a calibration mechanism and a force sensor configured by the method.

Background Art

The accuracy of scales or weighing apparatus equipped with force sensors in the weighing field will be reduced under long-term or high-frequency use. In order to maintain the accuracy of apparatus, the scales or weighing apparatus need to be calibrated periodically.

At present, there are two calibration methods in the weighing field: internal calibration and external calibration. The external calibration is generally realized by loading external weights ranging from several kilograms to hundreds of kilograms on a scale or weighing device. The external calibration method is very inconvenient to operate and expensive because it requires constant loading and unloading of external weights.

Internal calibration is currently mainly used in electromagnetic force balance sensors. Thanks to the principle of an electromagnetic force balancing the gravity, the internal calibration structure can be integrated into the sensor, thus realizing high accuracy of an electronic balance.

When it comes to the internal calibration of a load cell, a distinction must be made between electromagnetic force compensation load cells (MFR-LC) and strain gauge load cells (SG-LC) due to the different principle of measuring on which they are based. In a MFR load cell, the weight force of the weighing object is measured by way of an electrical substitute quantity. In such weighing cells that function according to the principle of electromagnetic force compensation and which are also referred to as magnetic force restoration load cells(MFR-LC), the weight force of the weighing object is transferred either directly or by way of one or more force-transmitting levers to an electromechanical measurement transducer which generates a compensation force corresponding to the weight force of the weighing object and at the same time delivers an electrical signal (the coil current) which is further processed by an electronic weighing module in the processor unit and indicated on a display panel. Given that in accordance with the laws of electromagnetism the magnitude of the coil current and the resultant force are proportionate to each other, so as the weight of a weighing object placed on the load cell can be determined through a measurement of the coil current.

Structurally, a strain gauge load cell (SG-LC) has an elastic body to which strain gauges have been secured. The body is usually made of aluminum, alloy steel, or stainless steel, which makes it very sturdy but also minimally elastic. This elasticity gives rise to the term "spring element", referring to the body of the load cell. When force is exerted on one end of the load cell, the spring element is slightly deformed, and unless overloaded, always returns to its original shape. As the spring element deforms, the strain gauges also change their shape. The resulting alteration to the resistance in the strain gauges can be measured as voltage. The change in voltage is proportional to the amount of force applied to the cell, thus the amount of force can be calculated from the output of the strain gauges.

In conclusion, the difference between the two measuring principles is the state when the load cell is loaded with a weight. While an MFR load cell returns a deflection to an equilibrium state for load measuring, the deflection in an SG load cell remains for load measuring.

In the prior art, attempts have also been made to integrate an internal calibration mechanism into a SG force sensor. For example, a calibration system for a scale is disclosed in U.S. Pat. No. 6,414,252 B1, wherein by adding an internal calibration mechanism comprising an internal calibration weight and a lever to a strain gauge sensor, the internal calibration mechanism is loaded when calibration is required, and the internal calibration mechanism is unloaded when calibration is not required, so that calibration of the strain gauge sensor is conveniently realized, and the accuracy of the sensor is kept from being degraded.

However, the internal calibration mechanism disclosed in U.S. Pat. No. 6,414,252 B1 in practice has great errors in calibration, which can even reach 1%, far exceeding the requirements identified by the standards. Therefore, this internal calibration mechanism cannot be effectively applied to SG force sensors.

In the prior art, there are also internal calibration mechanisms that are directly manufactured in force sensors, such as the sensor disclosed in DE 20 022 494 U1, wherein a structure specially used for loading internal calibration weights is designed in an elastic body. The processing and installation of such an internal calibration mechanism are very complicated, and its application range is narrow as the internal calibration mechanism is not applicable to force sensors of other structures.

SUMMARY

The technical problem to be solved by the present invention is that, internal calibration mechanisms of the prior art have great errors and thus maintaining the accuracy of a force sensor is not effective and reliable.

The present invention solves the above technical problem through the following technical solution:

A method for configuring a calibration mechanism in a force sensor, the method comprising the steps of:

coupling an end of the calibration lever to a loading end of the force sensor;

adjusting, in a no-load condition, the gravity centre of the unloaded calibration lever, so that the gravity centre is lying substantially on a horizontal line which goes through the centre of a calibration lever fulcrum at a fixed end of the force sensor; and adjusting, in a full-load condition, the gravity centre of the calibration lever loaded with the calibration weight, so that the gravity centre is lying substantially on the horizontal line which goes through the centre of the calibration lever fulcrum.

By configuring the position of the lever and the position of the fulcrum in the force sensor to be approximately on the same horizontal line, the calibration error caused by the inclination of the force sensor or an internal calibration mechanism is therefore reduced.

In the no-load condition and in the full-load condition a line connecting the centre of the calibration lever fulcrum and the respective gravity centre having an enclosed acute angle with the horizontal line between −2° and +2°. So the calibration error is relatively small and its influence on weighing accuracy is reduced.

Furthermore, the method further comprises:
configuring the gravity centre of the calibration lever with the calibration weight or without the calibration weight, so that the respective gravity centre is positioned distant from the coupled end of the calibration lever for loading the calibration weight and close to the centre of the calibration lever fulcrum.

Preferably, by coupling the end of the calibration lever to a fulcrum at the loading end of the force sensor, the calibration lever's rotation drives the movement of the loading end.

According to this solution, while the enclosed angle between the line connecting the centre-of-gravity position of the calibration mechanism or the lever and the fulcrum position and the horizontal line is within a certain degree range, the centre-of-gravity position of the lever is close to the fulcrum position to reduce the calibration error caused by the inclination of the internal calibration mechanism.

A force sensor, comprising
an elastic body, the elastic body having
a fixed end and
a loading end for loading the weight of an object to be weighed,
an intermediate part being provided between the fixed end and the loading end, wherein the intermediate part being provided with a transducer mechanism for converting the weight loaded on the loading end of the elastic body into a weighing signal; the force sensor further comprises
a calibration mechanism capable of applying a calibration force on the loading end; the calibration mechanism comprising
a calibration weight
a calibration lever being connected to the fixed end via a calibration lever fulcrum; wherein the calibration mechanism is configured according the method mentioned above.

According to the calibration mechanism in this solution, when the calibration weight is loaded, that is, in the internal calibration state, and after the calibration weight is unloaded, that is, in the normal weighing operation, the centre-of-gravity position of the overall calibration mechanism comprising the lever and the internal calibration weight and the fulcrum position at the fixed end are controlled to be approximately on the same horizontal line, so that zero errors caused by the inclination of the sensor are reduced when calibration weight is unloaded, and calibration errors caused by the inclination of the sensor or inclination of the internal calibration mechanism are reduced, and the accuracy of the force sensor is further maintained.

In this solution, the fulcrum mechanism can support the lever and enable the lever to pivot relative to the fixed end.

Further, the force sensor further comprises a weight loading mechanism for loading the calibration weight to the loading end of the lever or unloading the calibration weight from the loading end of the lever.

Further, the lever further comprises a centre-of-gravity adjusting device for adjusting the position of the centre of gravity of the lever or a calibration structure.

Still further, the centre-of-gravity adjusting device includes at least one counterweight loading part provided on the lever.

In this solution, a counterweight is added on the lever to fine-tune the position of the centre of gravity of the lever provided in the internal calibration mechanism, so that the position of the centre of gravity of the calibration mechanism and the centre position of the fulcrum of the fulcrum mechanism can be adjusted to the same horizontal line.

Further, the force sensor further comprises an inclination sensor for sensing the inclination of the force sensor relative to the horizontal plane. The force sensor compensates a calibration weighing value output by the force sensor based on the inclination sensed by the inclination sensor.

In this solution, the inclination of the force sensor is used to further correct the calibration value of internal calibration by compensation.

Further, the transducer mechanism comprises a strain gauge sensor or a capacitive pressure sensor or an optical sensor.

The transducer mechanisms in this solution all measure the force by sensing the deformation of the elastic body, so all transducer mechanisms based on the deformation measurement principle are applicable to the present invention.

A weighing apparatus comprises
at least one force sensor described above,
a calibration weighing value and an inclination value being obtained when an internal calibration mechanism of the force sensor is loaded with a calibration weight; and
a calibration compensation value being calculated from the calibration weighing value and the inclination value, and
wherein a calibration weighing value being outputted by the apparatus which has been corrected according to the calibration compensation value.

The positive and progressive effects of the above solution are as follows: By configuring the position of the lever and the position of the fulcrum in the force sensor to be approximately on the same horizontal line, the calibration error caused by the inclination of the force sensor or an internal calibration mechanism is therefore reduced, and the accuracy of the force sensor is thus maintained. An angle sensor is also used to sense the inclination of the force sensor, and the inclination is used to calculate and compensate the calibration value to further maintain the accuracy of the force sensor.

BRIEF DESCRIPTION OF THE DRAWINGS

The above-mentioned and other features, properties and advantages of the present invention will become more apparent from the following description of the embodiments with reference to the accompanying drawings, and the same reference numerals denote the same features throughout the figures, in which.

DETAILED DESCRIPTION OF EMBODIMENTS

The present invention will be further described below by way of examples, but the present invention is not therefore limited to the scope of the described embodiments.

In the process of loading/unloading calibration weights by the loading mechanism of a force sensor, the alignment of the lever gravity centre related to the position of the lever fulcrum is configured and controlled to be approximately on the same horizontal line, so that calibration errors caused by an inclination of the force sensor or an inclination of the internal calibration mechanism are reduced, and an inclination of the force sensor sensed by an angle sensor, like an inclination sensor, is also used for further compensation of the calibration, thereby maintaining the accuracy of the force sensor.

Hereinafter, the implementation of the present invention will be illustrated by way of examples via the following embodiments.

In the embodiment shown in FIGS. 1-4, according to the weighing apparatus, among two ends of the elastic body 101 of the force sensor 100, there is a fixed end 103 fixed to a base panel A and a loading end 102 provided with a tray B. The two ends of the elastic body 101 are connected by two parallel beams 104 parallel to each other. A set of strain gauges are provided on the parallel beams 104.

A calibration lever 1071 of the internal calibration mechanism is formed between the parallel beams 104, connected to the fixed end 103 at the lever fulcrum 1031 and the calibration lever 1071 rotates around the fulcrum 1031. The calibration lever 1071 also connects to the loading end 102 by a loading lever fulcrum 1021 when calibrating the force sensor.

An end portion of the calibration lever 1071 extending beyond the loading end 102 and is provided with a V-shaped weight bracket. A calibration weight 106 can be placed in the weight bracket and the V-shaped weight bracket can prevent the calibration weight 106 from sliding and shaking in the weight bracket.

Figure 1:
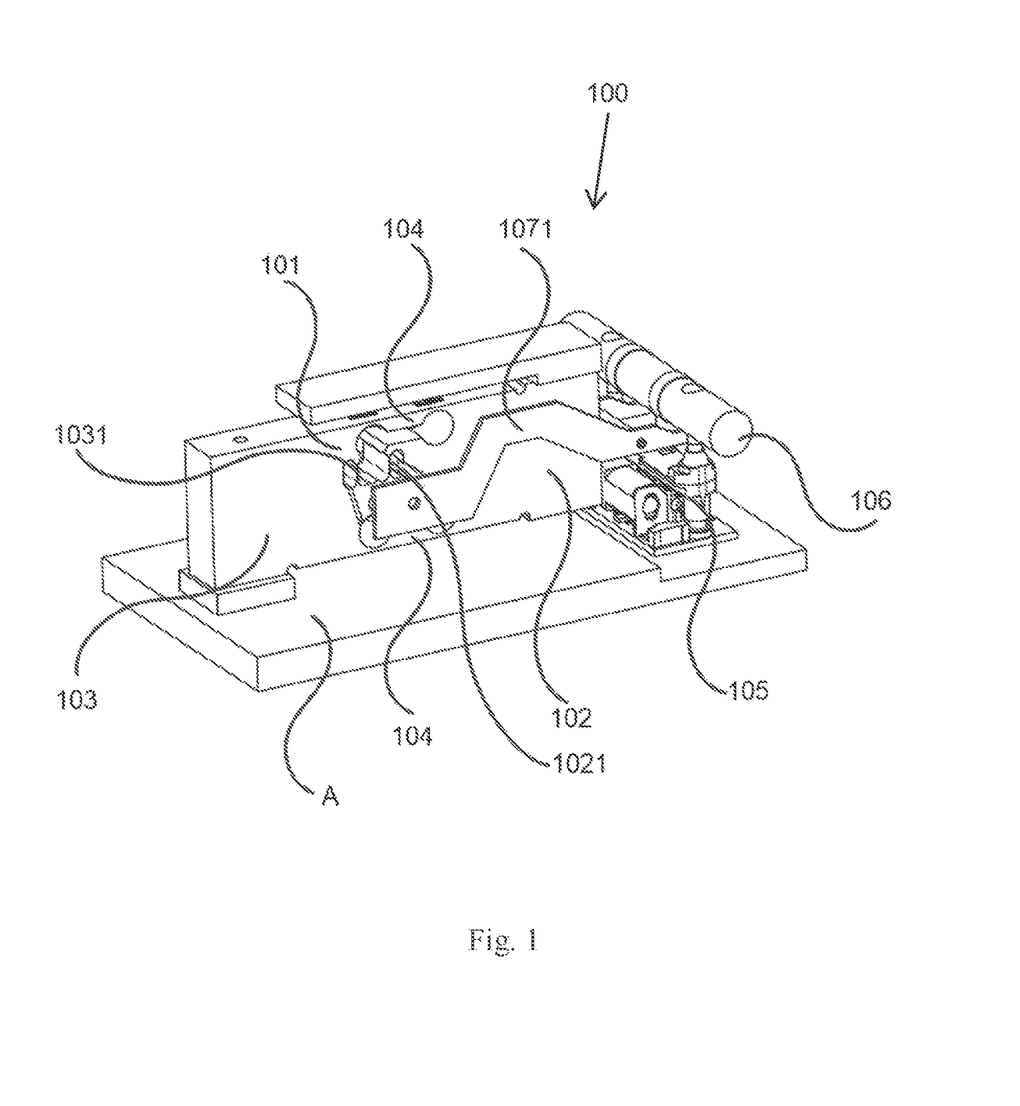
FIG. 1 is a schematic isometric view of a force sensor according to one embodiment of the present invention.
Figure 2:
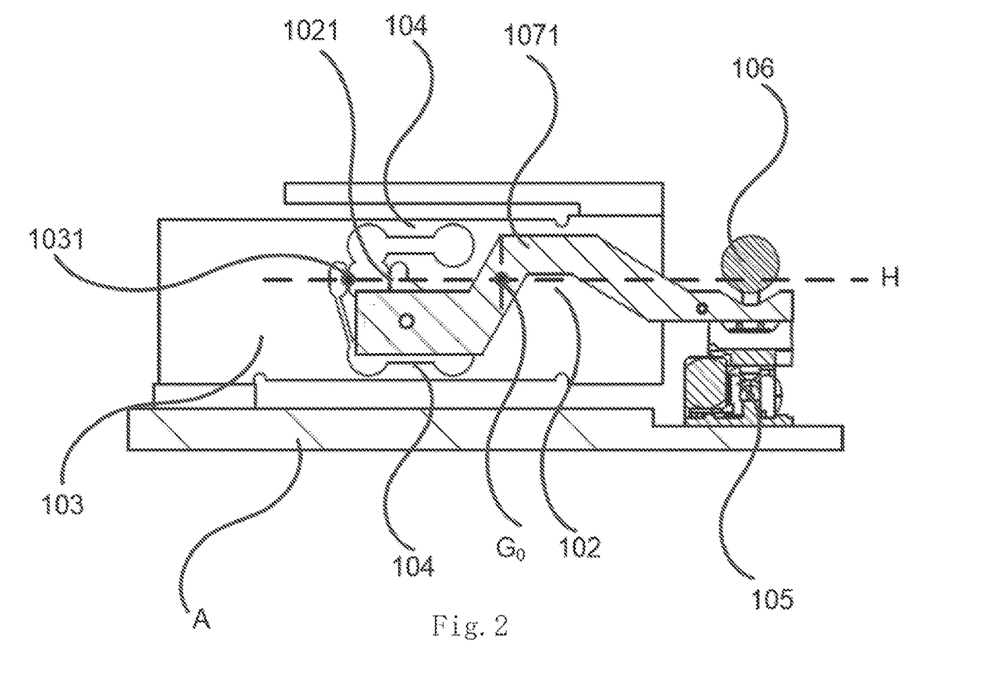
FIG. 2 is a schematic perpendicular cross-sectional view of a lever of the force sensor in FIG. 1 in the state of an unloaded calibration mechanism.
Figure 3:
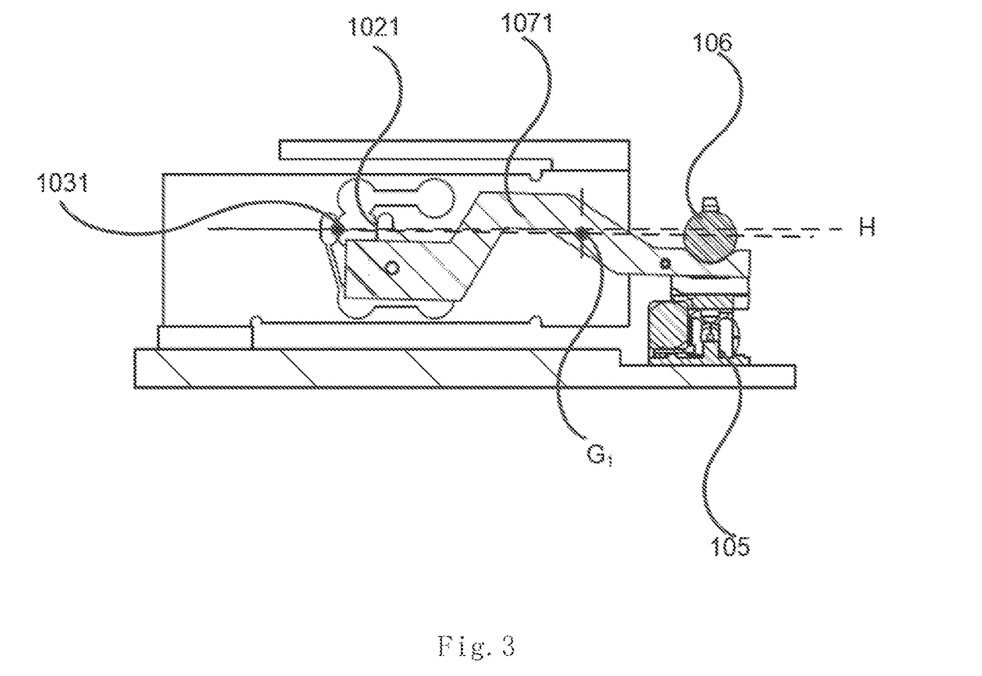
FIG. 3 is the same schematic perpendicular cross-sectional view of the force sensor in FIG. 2 with a lever in the state of a loaded calibration mechanism.
Figure 4:
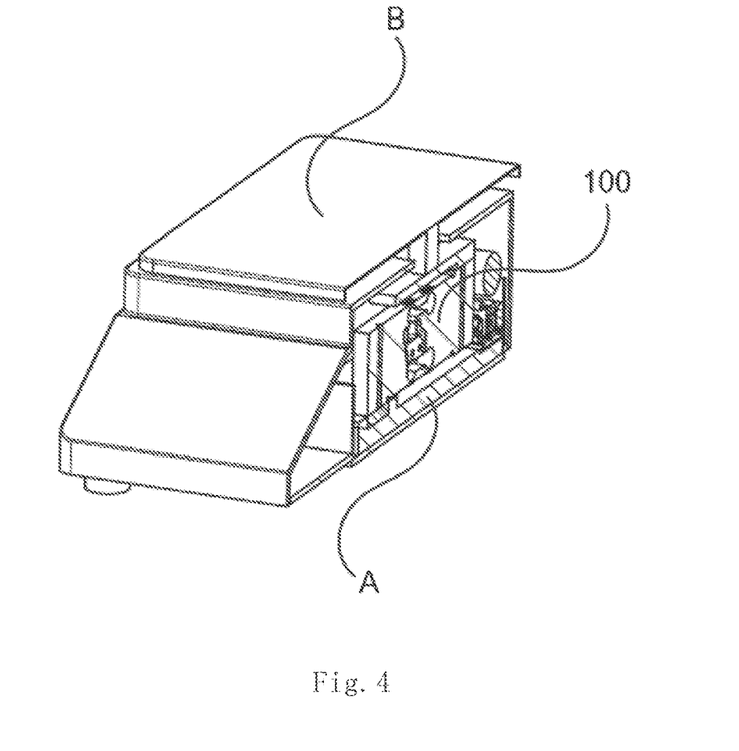
FIG. 4 is a schematic isometric view of a weighing apparatus with a cross-sectional cut off with the force sensor shown in FIG. 1.

In this embodiment, a loading mechanism 105 is fixed to the base panel A and is provided on the side of the loading end 102 which loads the calibration weight 106 on the weight bracket or unloads the calibration weight 106 from the weight bracket by a lifting movement as shown in FIGS. 2 and 3.

When configuring on the calibration mechanism in this embodiment, firstly, the calibration lever 1071 is coupled to the loading fulcrum 1021 located at the loading end 102 of the force sensor. After the coupling, the gravity centre $G_0$ of the calibration lever 1071 is adjusted in a no-load condition to lie substantially on a horizontal line H which goes through the centre of the calibration lever fulcrum 1031, when the calibration lever 1071 is unloaded. The gravity centre $G_1$ of the calibration lever 1071 together with the calibration weight 106 is adjusted in a full-load condition to lie substantially on the horizontal line H which goes through the centre of the calibration lever fulcrum 1031 when the calibration weight 106 is loaded on the calibration lever 1071 by the loading mechanism 105.

In this embodiment, as shown in FIG. 3, after the loading mechanism 105 loads the calibration weight 106 onto the calibration lever 1071, the centre-of-gravity position of the calibration lever loaded with the calibration weight 106 is $G_1$. A horizontal line H as shown is defined by having the level of the calibration lever fulcrum 1031. A straight line connecting the lever gravity centre $G_1$ and the calibration lever fulcrum 1031 is below the horizontal line H and forms an acute angle of $-2°$ with the horizontal line H.

In another configuration setting, the straight line connecting the calibration lever gravity centre $G_1$ and the calibration lever fulcrum 1031 is above the horizontal line H and forms an acute angle of $+2°$ with the horizontal line H. In another variation, the calibration lever gravity centre $G_1$ and the calibration lever fulcrum 1031 are on the horizontal line H, that is, the straight line connecting the gravity centre $G_1$ and the calibration lever fulcrum 1031 coincides with the horizontal line H in the environment where the force sensor 100 is located.

In those settings, the acute angle formed between the straight line connecting the calibration lever gravity centre $G_1$ and the calibration lever fulcrum 1031 and the horizontal line H is controlled between $-2°$ below the horizontal line and $+2°$ above the horizontal line H. In this case, the calibration error caused by the inclination of the calibration lever is controllable, which reduces the influence on weighing accuracy.

When configuring the calibration mechanism, before the loading mechanism 105 loads the calibration weight 106 onto the calibration lever 1071 or after the calibration weight 106 is unloaded from the calibration lever 1071, the calibration lever gravity centre $G_0$ of the calibration lever 1071 the calibration lever fulcrum 1031 are on the same horizontal line H, that is, the straight line connecting the calibration lever gravity centre $G_0$ and the calibration lever fulcrum 1031 coincides with the horizontal line H in the environment where the force sensor 100 is located.

In another configuration setting, the straight line connecting the calibration lever gravity centre $G_0$ and the calibration lever fulcrum 1031 is above the horizontal line H and forms an acute angle of $+2°$ with the horizontal line H. In another variation, the straight line connecting the calibration lever gravity centre $G_0$ and the calibration lever fulcrum 1031 is below the horizontal line H and forms an acute angle of $-2°$ with the horizontal line H.

As the setting mentioned above, when the calibration lever 1071 is unloaded, the included angle formed between the straight line connecting the centre-of-gravity position $G_0$ of the calibration lever 1071 and the lever fulcrum 1031 and the horizontal line H is controlled between $-2°$ below the horizontal line H and $+2°$ above the horizontal line H. The controllability of the calibration error caused by the inclination of the calibration lever is further improved, and the influence on weighing accuracy is reduced.

Figure 5:
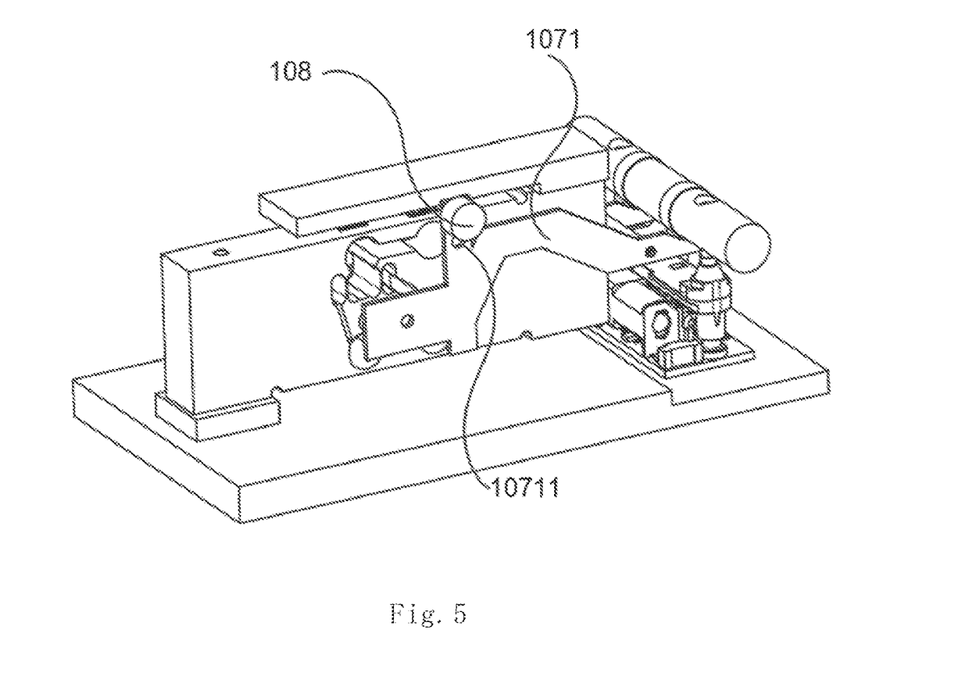
FIG. 5 is a schematic isometric view of a force sensor according to another embodiment of the present invention.
Figure 6:
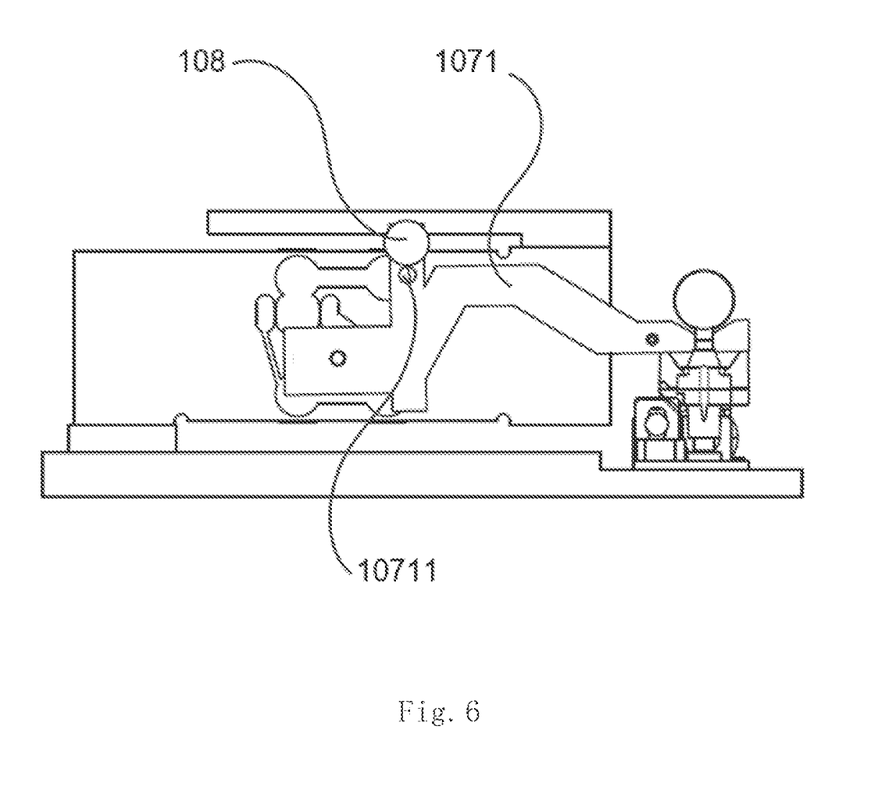
FIG. 6 is a schematic perpendicular cross-sectional view of a lever of the force sensor in FIG. 5 in the state of an unloaded calibration mechanism.

In another embodiment, as shown in FIGS. 5 and 6, the calibration lever 1071 is further provided with counterweight loading holes 10711. As shown in FIG. 5, in one counterweight loading hole 10711 a counterweight 108 is inserted so that the counterweight 108 is loaded on the calibration lever 1071, thereby further fine adjusting the lever gravity centre of the calibration lever 1071 and enabling the calibration lever gravity centre and the calibration lever fulcrum 1031 to be located on the same horizontal line H as much as possible. Moreover, two counterweight loading holes 10711 are provided on the calibration lever 1071, on which counterweights of other weights can be hung and loaded.

In another embodiment, counterweight loading parts are provided at different positions of the calibration lever and each counterweight loading part has at least one counterweight hole or counterweight loading position, respectively. The structure of counterweight loading part formed by two counterweight loading holes in this embodiment can be more simplified, for example, the calibration lever has only one counterweight loading position or loading through-hole, etc.

The force sensor 100 of this embodiment is further provided with an inclination sensor (not shown). The inclination sensor can be provided on the fixed end 103 of the force sensor 100 to sense the inclination of the force sensor 100 relative to the horizontal plane.

In this embodiment, when the force sensor 100 performs a calibration, the calibration weight 106 is loaded onto the V-shaped weight bracket. Using the leverage transmission rate of the calibration mechanism, the loading force, a multiple of the calibration weight, is applied to the loading end 102, and the strain gauge converts the loading force into an electrical signal of the calibration weighing value. Then, in this embodiment, the calibration compensation value is calculated by using the calibration weighing value and the inclination value sensed by the inclination sensor, and the calibration weighing value is further corrected by the calibration compensation value. Thereafter, the weighing output of the force sensor 100 is calibrated using the calibration weighing value to maintain the accuracy of the force sensor 100.

A platform scale of another embodiment comprises four force sensors 100 of the above embodiments. After the platform scale sends calibration instructions to each force sensor 100, each force sensor 100 performs internal calibration operations, such as loading internal calibration weights and outputting calibration weighing values, and then unloading the internal calibration weights. During the internal calibration operation, the inclination value is sensed at the same time.

The platform scale receives the calibration weighing value and the inclination value from each force sensor 100, and a processing unit of the platform scale completes the calculation and correction of the calibration weighing value and further calibrates the weighing output of the platform scale.

REFERENCE SIGNS LIST

100 Force sensor
101 Elastic body
102 Loading end
1021 Loading lever fulcrum
103 Fixed end
1031 Calibration lever fulcrum
104 Parallel beam
105 Loading mechanism
106 Calibration weight
1071 Calibration lever
10711 Counterweight loading hole
108 Counterweight
A Base panel
B Tray
$G_0$ Lever gravity centre of the unloaded calibration lever
$G_1$ Lever gravity centre including the loaded calibration weight
H Horizontal line

The invention claimed is:

1. A method for configuring a calibration mechanism in a force sensor, comprising the steps of:
coupling an end of a calibration lever to a loading end of the force sensor;
adjusting, in a no-load condition, a center of gravity of the calibration lever, so that the center of gravity lies substantially on a horizontal line which goes through a center of a calibration lever fulcrum at a fixed end of the force sensor; and
adjusting, in a full-load condition, the center of gravity of the calibration lever loaded with a calibration weight, so that the center of gravity lies substantially on the horizontal line which goes through the center of the calibration lever fulcrum;
wherein in the no-load condition, an enclosed acute angle between a line connecting the center of the calibration lever fulcrum and the center of gravity with the horizontal line is between −2° and +2°; and
wherein in the full-load condition, the enclosed acute angle between a line connecting the center of the calibration lever fulcrum and the center of gravity with the horizontal line is between −2° and +2°.

2. The method of claim 1, comprising the further step of:
configuring the center of gravity of the calibration lever with the calibration weight or without the calibration weight, so that the respective center of gravity is positioned distant from the coupled end of the calibration lever for loading the calibration weight and close to the center of the calibration lever fulcrum.

3. The method of claim 1, comprising the further step of:
coupling the end of the calibration lever to a loading lever fulcrum located at the loading end of the force sensor.

4. A force sensor, comprising:
an elastic body, comprising a fixed end and a loading end for loading the weight of an object to be weighed, with an intermediate part being provided between the fixed end and the loading end, wherein the intermediate part being provided with a transducer mechanism for converting the weight loaded on the loading end of the elastic body into a weighing signal;
a calibration mechanism capable of applying a calibration force on the loading end, the calibration mechanism comprising:
a calibration weight; and
a calibration lever being connected to the fixed end via a calibration lever fulcrum;
wherein the calibration mechanism is configured according to the method of claim 1.

5. The force sensor of claim 4, wherein the calibration lever includes an adjusting device for adjusting the position of the center of gravity of the calibration lever.

6. The force sensor of claim 5, wherein the adjusting device comprises at least one counterweight loading part provided on the calibration lever.

7. The force sensor of claim 4, further comprising:
a weight loading mechanism for loading the calibration weight to the loading end of the calibration lever and unloading the calibration weight from the loading end of the calibration lever.

8. The force sensor of claim 4, further comprising: an inclination sensor for sensing an inclination of the force sensor relative to a horizontal plane,
wherein the force sensor compensates a calibration weighing value output by the force sensor based on the inclination sensed by the inclination sensor.

9. The force sensor of claim 4, wherein the transducer mechanism comprises a strain gauge sensor.

10. A weighing apparatus, comprising at least one force sensor according to claim 4; wherein:
a calibration weighing value and an inclination value are obtained when the calibration mechanism of the force sensor is loaded with a calibration weight;

a calibration compensation value is calculated from the calibration weighing value and the inclination value, and a calibration weighing value is outputted by the apparatus which has been corrected according to the calibration compensation value.

11. The force sensor of claim 4, wherein the transducer mechanism comprises a capacitive pressure sensor.

12. The force sensor of claim 4, wherein the transducer mechanism comprises an optical sensor.

\* \* \* \* \*